United States Patent [19]
Ebenhoch

[11] Patent Number: 4,563,113
[45] Date of Patent: Jan. 7, 1986

[54] INDEXABLE INSERT DRILL

[75] Inventor: Sebastian Ebenhoch, Menomonee Falls, Wis.

[73] Assignee: Waukesha Cutting Tools, Inc., Waukesha, Wis.

[21] Appl. No.: 485,003

[22] Filed: Apr. 14, 1983

[51] Int. Cl.[4] .......................................... B23B 51/00
[52] U.S. Cl. ................................. 408/223; 408/186; 408/199; 408/713
[58] Field of Search ............... 408/186, 188, 189, 199, 408/207, 223, 224, 227, 229, 713

[56] References Cited

U.S. PATENT DOCUMENTS

| | | | |
|---|---|---|---|
| 3,540,323 | 11/1970 | Rishel | 408/713 X |
| 3,963,365 | 6/1976 | Shallenberger, Jr. | 408/186 |
| 4,124,328 | 11/1978 | Hopkins | 408/224 |
| 4,194,862 | 3/1980 | Zweekly | 408/224 |
| 4,252,480 | 2/1981 | Mizuno et al. | 408/223 |
| 4,268,198 | 5/1981 | Peters | 408/186 |
| 4,293,252 | 10/1981 | Kress et al. | 408/713 X |
| 4,367,991 | 1/1983 | Grafe et al. | 408/223 X |

FOREIGN PATENT DOCUMENTS

| | | | |
|---|---|---|---|
| 2843788 | 5/1979 | Fed. Rep. of Germany | 408/713 |
| 173093 | 12/1965 | U.S.S.R. | 408/186 |
| 643252 | 1/1979 | U.S.S.R. | 408/223 |

Primary Examiner—Gil Weidenfeld
Assistant Examiner—Glenn L. Webb

Attorney, Agent, or Firm—Andrus, Sceales, Starke & Sawall

[57] ABSTRACT

An indexable insert drill is disclosed that avoids formation of a breakout slug and therefore is particularly suited for drilling a laminate workpiece or stacked workpieces. The tool includes a cylindrical body provided with opposed flutes. A radially inner indexable carbide insert is releasably secured in the back wall of one flute at the leading end of the body and a radially outer insert is similarly secured in the back wall of the opposed flute. The inserts present an active cutting edge generally disposed in a transverse plane containing the axis of the tool and in axially leading relation relative to the tool body, and together are adapted to cut a hole of given diameter with the active cutting edges providing for overlap therebetween. The active cutting edges of the respective inserts have an axially leading point adjacent to their inner extremity disposed in a common plane generally normal to the tool axis and extend obliquely therefrom at a trailing angle relative to that common plane with the active cutting edge of the inner insert having a lesser trailing angle than the active cutting edge of the outer insert. The location and orientation of the inserts in the tool body providing for their respective active cutting edges to cut paths that intercept each other such that each insert will cut a pair of radially spaced chip segments as the tool progresses relative to a workpiece.

7 Claims, 6 Drawing Figures

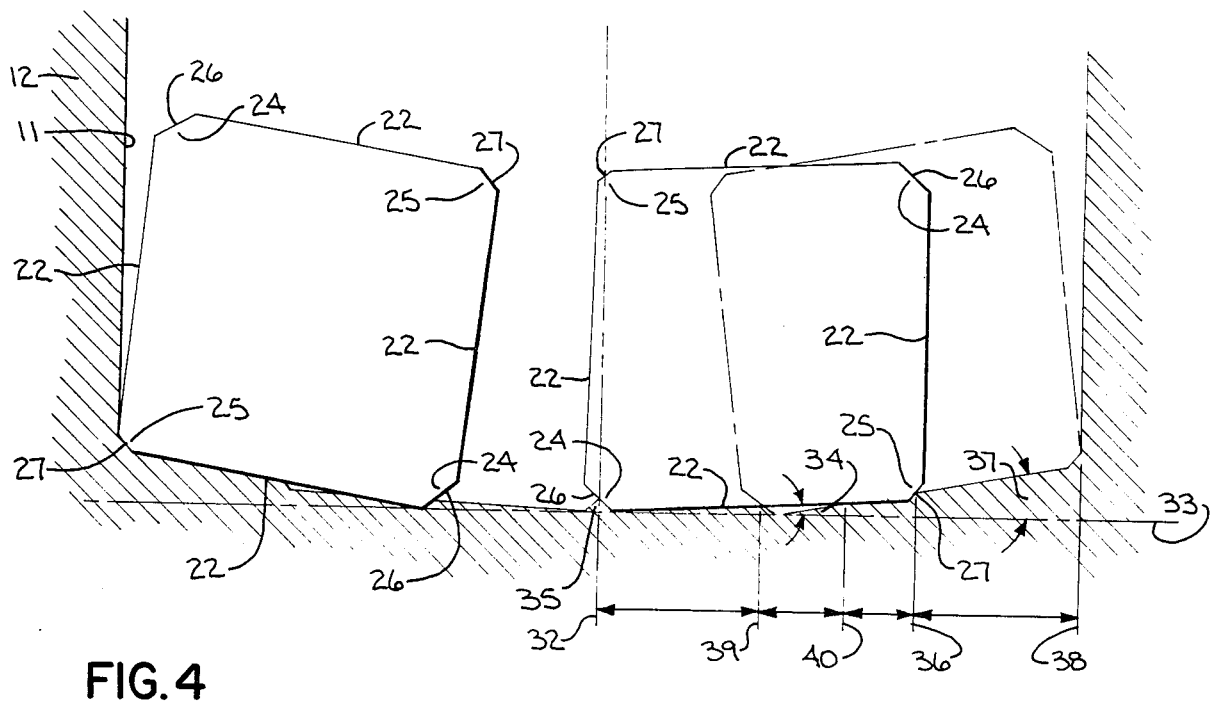
FIG. 4
FIG. 5
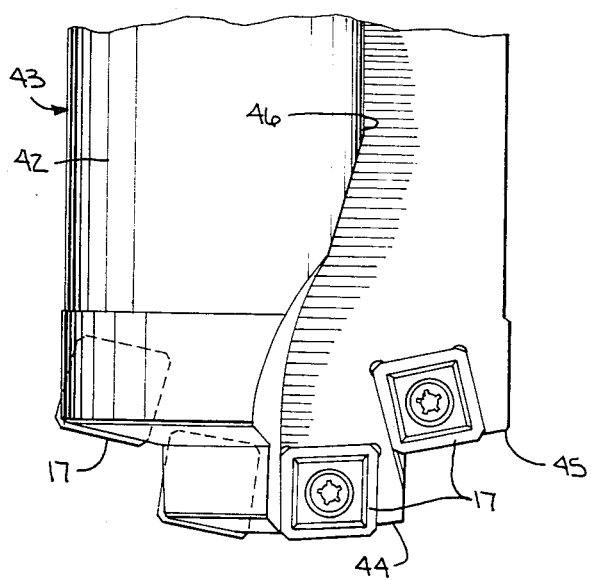
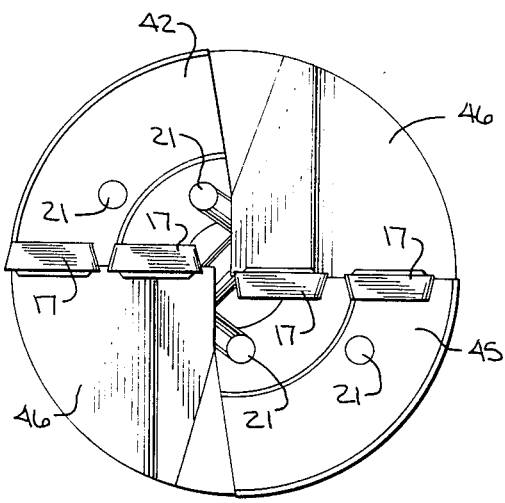
FIG. 6

INDEXABLE INSERT DRILL

BACKGROUND OF THE INVENTION

This invention relates to an indexable insert drill and more particularly to such a drill which finds particular application for drilling a laminate workpiece.

When cutting a through-bore, some indexable insert drills terminate with a slug at breakout. If the workpiece is a laminate structure or comprises several stacked workpieces, such a drill will produce a slug at breakout from each layer of material. Except for the bottommost layer of a laminate workpiece, the breakout slugs are trapped between the drill and the next adjacent layer of material. Such a trapped breakout slug tends to rotate with the drill to impede the cutting operation and may possibly cause failure and destruction of the drill. It is generally an object of this invention to provide an indexable insert drill that avoids formation of a breakout slug and is capable of a smooth transition between the layers of a laminate workpiece.

SUMMARY OF THE INVENTION

The invention relates to a tool for drilling or boring a hole in a workpiece which may be a laminate structure and includes a cylindrical tool body having diametrically opposed, axially extending flutes that open toward the leading end of the body. A carbide cutting insert is releasably secured in the back wall of each flute at the leading end of the body with their cutting face facing in the direction of relative cutting motion between the tool and workpiece. Each of the inserts presents an active cutting edge generally disposed in a transverse plane containing the tool axis and in axially leading relation relative to the tool body. The active cutting edge of the inner insert generally extends outwardly from the tool axis and the active cutting edge of the outer insert extends inwardly toward the tool axis from a location beyond the periphery of the tool body. The inner and outer inserts together are adapted to cut a hole of given diameter with the active cutting edges of the respective inserts providing for overlap therebetween. The active cutting edges of the respective inserts have an axially leading point adjacent to their inner extremity disposed in a common plane generally normal to the tool axis and extend obliquely at a trailing angle relative to that plane, with the active cutting edge of the inner insert having a lesser trailing angle than the active cutting edge of the outer insert. The location and orientation of the inserts in the tool body providing for their respective active cutting edges to cut paths that intercept each other such that each insert will cut a pair of radially spaced chip segments as the tool progresses relative to a workpiece.

DESCRIPTION OF THE DRAWING FIGURES

The drawings furnished herewith illustrate the best mode presently contemplated for the invention and are described hereinafter.

In the drawings

FIG. 4 is an enlarged schematic view and shows the configuration of the hole being drilled, and to the right of the centerline, the outer insert is superposed in phantom on the inner insert to illustrate the cutting relationship between the cutting inserts;

FIG. 5 is a view generally similar to that of FIG. 2 and shows an embodiment of the drill for making larger diameter holes in a workpiece; and FIG. 6 is a bottom plan view of the drill shown in FIG. 5.

DESCRIPTION OF THE ILLUSTRATED EMBODIMENTS

Figure 1:
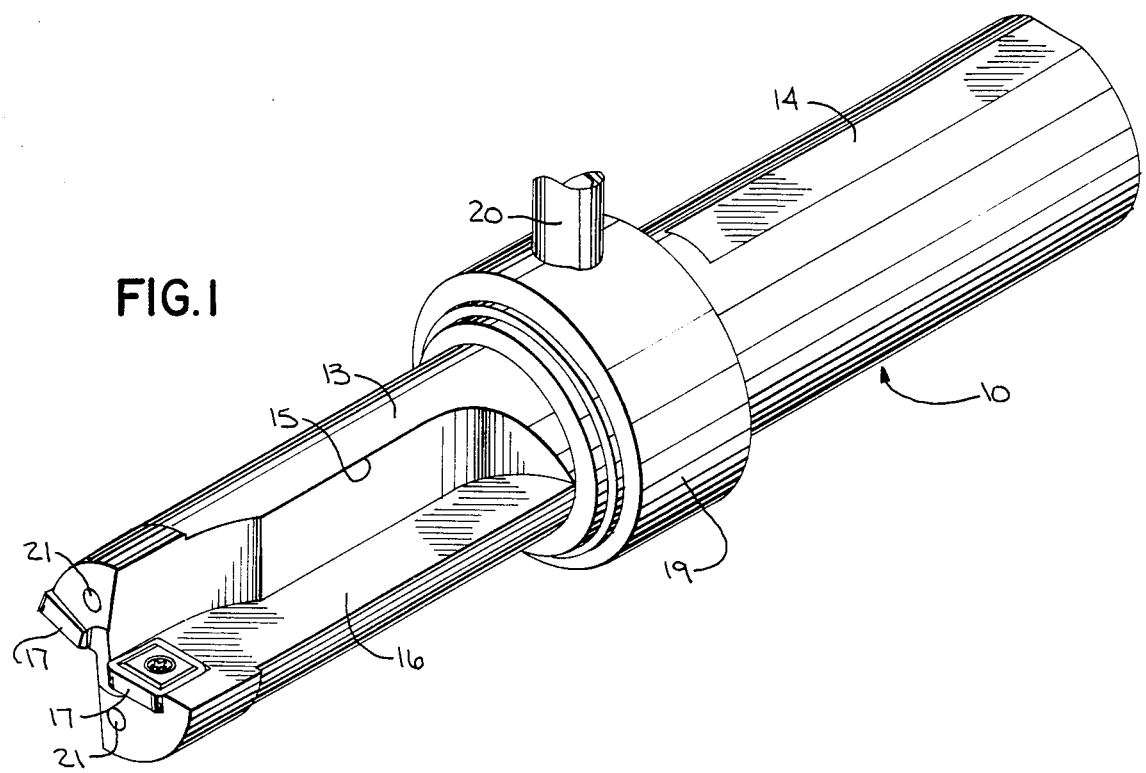
FIG. 1 is a perspective view of the indexable insert drill of this invention.
Figure 2:
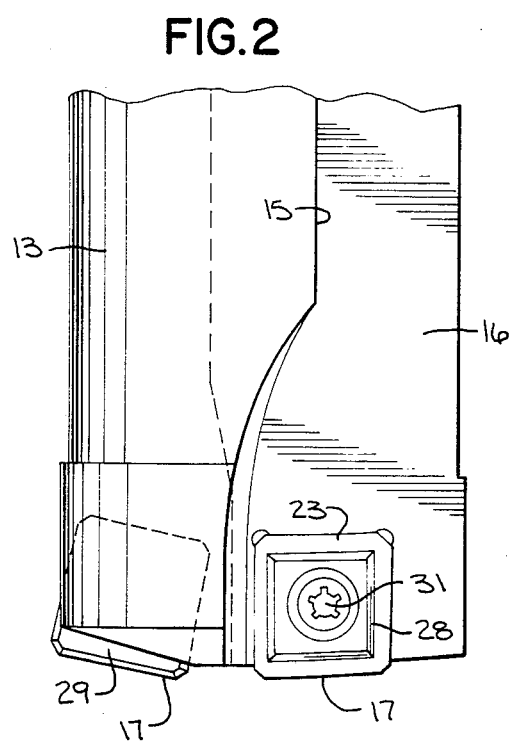
FIG. 2 is an enlarged side elevation of the leading end portion of the drill.
Figure 3:
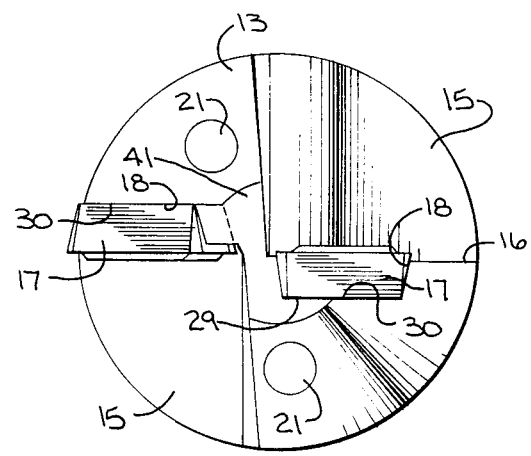
FIG. 3 is an enlarged bottom plan view of the drill.

Referring to the drawings, the indexable insert drill 10 for cutting a hole 11 in a metal workpiece 12 generally comprises a cylindrical body 13 having an axially extending shank 14 at one end thereof for engaging within an appropriate machine, not shown. The body 13 is provided with a pair of diametrically opposed flutes 15 that open in a direction oppositely from the shank 14 at the leading end of the tool 10. Each flute 15 has a diametrically disposed generally flat back wall 16 that trails rotationally during a cutting operation and carries one or more carbide cutting inserts 17 in suitable pockets 18 that open to the leading end of the tool. Either the tool 10 or the workpiece 12 may be rotated in the machine, not shown, to produce the hole 11 in the workpiece.

The tool 10 includes a coolant inducer ring 19 which is mounted on the shank 14 adjacent to the body 13. A coolant under pressure is introduced into the ring 19 through an appropriate fitting 20 from a source not shown. The coolant inducer ring 19 communicates with one or more axially extending passages 21 in the tool 10 that open at the leading end of the tool body 13 whereby the coolant under pressure is directed to the leading end of the tool to cool the cutting edges and evacuate the chips in service.

The cutting inserts 17 are generally rhombic or diamond shaped providing four (4) main cutting edges 22 at the periphery of the cutting face 23. The respective diametrically opposed corners 24 and 25 of the inserts 17 are 86° and 94°, respectively. The opposed corners 24 of lesser sized angle are beveled to present auxiliary cutting edges 26 while the corners 25 of larger sized angle are beveled to form the auxiliary cutting edges 27. The cutting face 23 of the several inserts 17 are provided with a chip breaking projection 28 which is spaced innwardly from and generally parallels the several main cutting edges 22.

The inserts 17 are undercut from their cutting face 23 to a generally parallel rear face 29. The rear face 29 of the inserts 17 seat against the back wall 30 of the corresponding pockets 18, with the back wall being inclined relative to the axis of the tool 10 in a manner to place the active main cutting edges 22 of the inserts in a leading position both axially and rotationally to provide for cutting of the workpiece material by a shearing action. The cutting inserts 17 are apertured centrally for securement by a threaded member 31 which extends through the insert and engages within a corresponding threaded opening in the pocket back wall 30.

FIG. 4 shows the general configuration of the hole 11 as the tool 10 progresses through a workpiece 12. FIG. 4 also generally shows the cutting relationship between the inner and outer inserts 17 with the outer insert being additionally shown superimposed in phantom in a common plane with the inner insert to the right of the centerline 32 of the tool.

As further shown in FIG. 4, the inner insert 17 is oriented with a lesser sized angle corner 24 in lead position axially adjacent to the centerline 32 of the tool 10 and with the inner extremity of the active main cutting edge 22 spaced a short distance from the tool centerline. The active main cutting edge 22 of the inner insert 17 is disposed at a trailing angle of 3° relative to a transverse plane 33 normal to the centerline 32 and containing the inner extremity of the active main cutting edge, the angle being shown at 34 in FIG. 4. With the inner insert 17 so oriented, the auxiliary cutting edge 26 adjoining the active main cutting edge 22 will extend angularly to and across the centerline 32 forming a small conical protuberance 35 centrally of the hole 11 being cut in the workpiece 12. The orientation of the inner insert 17 further provides that the active main cutting edge 22 along with the adjacent auxiliary cutting edges 26 and 27, which together constitute the full length of the active cutting edge of the insert 17, are capable of cutting a swath or circular segment extending radially outwardly from the centerline 32 to the line 36 as shown in FIG. 4.

The inner extremity of the active main cutting edge 22 of the radially outer insert 17 constitutes the axially leading point of that insert and is also disposed on the common plane 33 containing the leading point of the inner insert 17. The corner of the outer insert 17 at the inner extremity of the active cutting edge 22 is one of lesser angle of the rhombic or diamond shaped insert such that the diameter of the hole 11 in the workpiece 12 is established or determined by the active auxiliary cutting edge 27. Relative to the plane 33, the active main cutting edge 22 of the outer insert 17 is disposed at a trailing angle of 10° as generally shown in FIG. 4 at 37.

With continuing reference to FIG. 4, the outer insert 17 is shown in phantom superposed on the inner insert to generally show the working or cutting relationship therebetween. The orientation of the outer insert 17 provides that its active main cutting edge 22 along with the adjacent auxiliary cutting edges 26 and 27 are capable of cutting a swath or doughnut shaped segment extending radially inwardly from the wall 38 at the wall of the hole 11 to the line 39. The location and orientation of the respective cutting inserts 17 provide for some overlap between their respective paths such that the active cutting edge of each insert will intercept the active cutting edge of the other insert to thereby divide the radial extent of hole 11 into four (4) segments and thus reduce the size of the chip material for easier and more efficient evacuation. According to FIG. 4, the inner insert 17 will cut radially spaced chip segments which extend from centerline 32 to line 39 and from line 40 to line 36 while the outer insert will cut spaced chip segments from line 39 to line 40 and from line 36 to line 38. Since the respective inserts 17 axially lead at the inner extremity of their active main cutting edges 22 there can be no slug formation at breakout. Thus, even when drilling a hole in laminate material, chip formation and transition from one layer into the next layer will be continuous and smooth.

The width of the back wall 16 of the opposed flutes 15 will vary in accordance with the diameter of the tool body 13. In the embodiment depicted in FIG. 4, a lesser angle corner 24 of the rhombic or diamond shaped insert 17 is disposed at the inner extremity of the active main cutting edge 22 of the outer insert to provide a body rib 41 of maximum thickness between the outer insert, and/or the pocket 18 therefor, and the opposed flute 15 for the inner insert. In those circumstances where the width of the flutes 15 permit and an adequate body rib 41 remains, the outer insert 17, and the pocket 18 therefor, may be so oriented that a larger angle corner 25 of the rhombic or diamond shaped insert is disposed at the inner extremity of the active main cutting edge 22.

For holes 11 having a diameter exceeding the capacity of a pair of cutting inserts 17 as described hereinbefore, a plurality of additional inserts may be utilized to obtain the desired diameter. According to the embodiment of FIGS. 5 and 6, the body 42 of the tool 43 is provided with four (4) cutting inserts 17.

With particular reference to FIG. 5, the innermost and next innermost cutting inserts 17 are disposed and oriented similarly as shown in FIG. 4 with a lesser angle corner 24 of the inserts disposed at their respective leading inner extremities of the active main cutting edges 22, and with the latter disposed at trailing angles of 3° and 10°, respectively, relative to the common plane normal to the tool centerline and containing the inner extremities of such active main cutting edges.

The innermost and next innermost cutting inserts 17 are disposed in a leading tier 44 of the tool 43, while the outermost and next outermost inserts are disposed in a second tier 45 offset outwardly and spaced in a trailing direction from the leading tier. As shown in FIG. 6, the active main cutting edges 22 of all four (4) inserts 17 are generally disposed in a common plane along the axis of the tool 43, with the innermost and next outermost inserts associated with one flute 46 and the outermost and next innermost inserts associated with the opposed flute.

The outermost and next outermost inserts 17, along with the pockets 18 therefor, disposed in the trailing tier 45 of the tool 43, are oriented oppositely from the innermost and next innermost inserts of the leading tier 44. The leading inner extremities of the active main cutting edges 22 of the outermost and next outermost insert 17 are disposed in transverse planes generally normal to the axis of the tool 43, and a larger angle corner 25 of the rhombic or diamond shaped inserts are disposed at such inner extremities. From the planes of their inner extremities, the active main cutting edges 22 of the outermost and next outermost inserts 17 extend outwardly at a trailing angle of 10°. With the inner extremities of the active main cutting edges 22 of the outermost and next outermost inserts being in axial lead position in the trailing tier, such inserts will also progress by chip formation at breakout as opposed to forming a slug even when moving from one layer to the next layer of a laminate workpiece 12. The outermost and next outermost inserts 17 in the trailing tier 45 will progress through a workpiece 12 by cutting two additional chip segments radially outwardly from the chip formation arrangement discussed hereinbefore relative to FIG. 4.

In the tool 43 of FIGS. 5 and 6 all four (4) inserts 17 are indexable 180° for reinsertion in the same pocket 18 to present a fresh active cutting edge for service. Since the inserts 17 of the trailing tier 45 are oppositely oriented from the inserts in the leading tier 44, an indexable interchange of the rhombic or diamond shaped inserts between the tiers will permit utilization in the active cutting position of all four (4) cutting edges of the inserts.

Various modes of carrying out the invention are contemplated as being within the scope of the following claims particularly pointing out and distinctly claiming the subject matter which is regarded as the invention.

I claim:

1. In a tool for producing a hole in a workpiece by relative rotary motion between the tool and workpiece, a cylindrical tool body formed with a pair of axially extending, diametrically opposed flutes having a back wall and opening toward the leading end of the body, an indexable carbide cutting insert having a cutting face defining a plurality of cutting edges at the periphery thereof and releaseably secured at the leading end of the body in the back wall of each flute with the cutting face of each insert facing in the direction of relative cutting motion, each said insert presenting an active cutting edge generally disposed in a transverse plane containing the axis of the tool and in axially leading relation relative to the tool body, the active cutting edge of the inner of said inserts generally extending outwardly from the tool axis and the active cutting edge of the outer of said inserts generally extending inwardly toward the tool axis from a location beyond the periphery of the tool body, said inserts together being adapted to cut a hole of given diameter with the active cutting edges of the respective inserts providing for overlap therebetween, said active cutting edges of the respective inserts having an axially leading point adjacent to their inner extremity disposed in a common plane generally normal to the tool axis and said active cutting edges extending obliquely at a trailing angle relative to said common plane with the active cutting edge of the inner insert having a lesser trailing angle than the active cutting edge of the outer insert, the location and orientation of said inserts in the tool body providing for their respective active cutting edges to cut paths that intercept each other such that each insert will cut a pair of radially spaced chip segments as the tool progresses relative to a workpiece.

2. The structure as set forth in claim 1 wherein the active cutting edge of the inner insert extends at a trailing angle of 3° from the plane normal to the tool axis and containing the axially leading point of said cutting edge.

3. The structure as set forth in claim 1 wherein the active cutting edge of the outer insert extends at a trailing angle of 10° from the plane normal to the tool axis and containing the axially leading point of said cutting edge.

4. The structure as set forth in claim 1 wherein the active cutting edges of the inner and outer inserts respectively extend at a trailing angle of 3° and 10° from the common plane normal to the tool axis and containing the axially leading point of their respective active cutting edges.

5. The structure as set forth in claim 1 wherein the inserts are rhombic-shaped with the corners thereof beveled such that the active cutting edges of the respective inserts comprise a main cutting edge intermediate a pair of auxiliary cutting edges, the inner extremity of the main cutting edge of the respective inserts providing the axially leading points disposed in the common plane generally normal to the tool axis.

6. The structure as set forth in claim 1 wherein the previously defined inserts comprise a leading cutting tier of the tool and the tool body is offset outwardly and in a trailing direction from the leading tier, at least one additional cutting insert releasably secured to the back wall of each flute to present an active cutting edge generally disposed in the same transverse plane of the previously defined inserts and in axially leading relation relative to the offset portion of the tool body to provide the tool with a second cutting tier, said additional inserts of the second cutting tier being varyingly spaced relative to the axis of the tool to provide an outermost insert and a next outermost insert which together with the previously defined inserts of the leading cutting tier are adapted to cut a hole of given diameter, the active cutting edges of the additional inserts in the second cutting tier having an axially leading point adjacent to their inner extremity disposed in planes generally normal to the tool axis and extending obliquely to said planes at generally the same trailing angle.

7. The structure as set forth in claim 6 wherein the trailing angle for the active cutting edges of the respective additional inserts in the second cutting tier is 10° relative to the corresponding planes generally normal to the tool axis and containing the inner extremities of the active cutting edges.

* * * * *